United States Patent
Sakamoto et al.

(10) Patent No.: US 10,776,860 B2
(45) Date of Patent: Sep. 15, 2020

(54) RETAIL WEBSITE USER INTERFACE, SYSTEMS, AND METHODS FOR DISPLAYING TRENDING LOOKS

(71) Applicant: TARGET BRANDS INC., Minneapolis, MN (US)

(72) Inventors: Kevin Sakamoto, Minneapolis, MN (US); Matt Maly, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 691 days.

(21) Appl. No.: 15/070,652

(22) Filed: Mar. 15, 2016

(65) Prior Publication Data
US 2017/0270599 A1    Sep. 21, 2017

(51) Int. Cl.
*G06Q 30/06* (2012.01)
*G06Q 50/00* (2012.01)

(52) U.S. Cl.
CPC ......... *G06Q 30/0643* (2013.01); *G06Q 50/01* (2013.01)

(58) Field of Classification Search
CPC ......... G06Q 30/06–0645; G06Q 30/08; G06Q 50/01
See application file for complete search history.

(56) References Cited

U.S. PATENT DOCUMENTS

| | | | |
|---|---|---|---|
| 5,623,590 A | 4/1997 | Becker et al. | |
| 6,320,602 B1 | 11/2001 | Burkardt et al. | |
| 7,370,284 B2 | 5/2008 | Andrea et al. | |
| D571,820 S | 6/2008 | Scott et al. | |
| D582,936 S | 12/2008 | Scalisi et al. | |
| D589,974 S | 4/2009 | Kase | |
| D591,765 S | 5/2009 | Amacker | |
| 7,607,150 B1 | 10/2009 | Kobayashi et al. | |
| 7,818,689 B2 | 10/2010 | Wada | |
| 8,386,486 B2 | 2/2013 | Zhang et al. | |
| D695,781 S | 12/2013 | Edwards et al. | |
| 8,788,365 B2 * | 7/2014 | Paul .................. G06Q 30/02 705/26.5 |
| 8,819,726 B2 | 8/2014 | Wetzer et al. | |
| 8,861,866 B2 | 10/2014 | Zhang et al. | |
| 8,873,851 B2 * | 10/2014 | Fedorovskaya ... G06F 17/30247 382/170 |
| 8,880,496 B2 | 11/2014 | Nagaralu et al. | |
| D732,562 S | 6/2015 | Yan et al. | |

(Continued)

OTHER PUBLICATIONS

Dreamstime, "New Stock Photos and Images, Best Selling," Mar. 13, 2015; https://web.archive.org/web/20150313224551/http://www.dreamstime.com/new-stock-photos-images (Year: 2015).*

(Continued)

*Primary Examiner* — Adam L Levine
(74) *Attorney, Agent, or Firm* — Hamre, Schumann, Mueller & Larson, P.C.

(57) ABSTRACT

A system including a graphical user interface (GUI) displayed on a display device is disclosed. The GUI includes a plurality of images displayed on the display device, each image being of a look that is determined to be trending within a previous time period; and each image is displayed as taken by a photographer and posting on a social network.

8 Claims, 6 Drawing Sheets

(56) References Cited

U.S. PATENT DOCUMENTS

| | | | |
|---|---|---|---|
| 9,070,171 B2* | 6/2015 | Guo | G06T 11/60 |
| 9,846,904 B2* | 12/2017 | Alcott | G06Q 30/0643 |
| 2003/0007016 A1 | 1/2003 | Laffey et al. | |
| 2010/0191578 A1* | 7/2010 | Tran | G06Q 30/02 |
| | | | 705/26.7 |
| 2012/0095863 A1 | 4/2012 | Schiff et al. | |
| 2012/0130862 A1 | 5/2012 | Tedjamulia et al. | |
| 2012/0140987 A1 | 6/2012 | Singh et al. | |
| 2012/0197750 A1 | 8/2012 | Batra et al. | |
| 2013/0036164 A1 | 2/2013 | Carduner et al. | |
| 2013/0073972 A1 | 3/2013 | Yung et al. | |
| 2013/0239049 A1 | 9/2013 | Perrodin et al. | |
| 2013/0290172 A1 | 10/2013 | Mashinsky | |
| 2013/0297694 A1* | 11/2013 | Ghosh | H04L 67/02 |
| | | | 709/204 |
| 2013/0325550 A1 | 12/2013 | Varghese et al. | |
| 2013/0330019 A1 | 12/2013 | Kim et al. | |
| 2014/0012925 A1 | 1/2014 | Narayanan et al. | |
| 2014/0019264 A1* | 1/2014 | Wachman | G06Q 30/0276 |
| | | | 705/14.72 |
| 2014/0040371 A1 | 2/2014 | Gurevich et al. | |
| 2014/0180864 A1 | 6/2014 | Orlov et al. | |
| 2014/0201227 A1 | 7/2014 | Hamilton-Dick et al. | |
| 2014/0278998 A1* | 9/2014 | Systrom | G06Q 30/0277 |
| | | | 705/14.57 |
| 2014/0279068 A1 | 9/2014 | Systrom et al. | |
| 2014/0282256 A1 | 9/2014 | Fish et al. | |
| 2014/0310079 A1 | 10/2014 | Girard et al. | |
| 2014/0337151 A1 | 11/2014 | Crutchfield | |
| 2015/0013016 A1 | 1/2015 | Kanter et al. | |
| 2015/0039176 A1 | 2/2015 | Fish | |
| 2015/0049953 A1 | 2/2015 | Movellan et al. | |
| 2015/0058079 A1* | 2/2015 | Freund | G06Q 30/0202 |
| | | | 705/7.31 |
| 2015/0127592 A1 | 5/2015 | Yan et al. | |
| 2015/0127727 A1 | 5/2015 | Tseng et al. | |
| 2015/0149539 A1 | 5/2015 | Shukla et al. | |
| 2015/0150023 A1 | 5/2015 | Johnson et al. | |
| 2015/0154167 A1 | 6/2015 | Arhin et al. | |
| 2015/0170039 A1 | 6/2015 | Hostyn et al. | |
| 2015/0186419 A1 | 7/2015 | Agrawal | |
| 2015/0186977 A1 | 7/2015 | Leonard et al. | |
| 2015/0186985 A1 | 7/2015 | Alcott et al. | |
| 2015/0206349 A1 | 7/2015 | Rosenthal et al. | |
| 2015/0220854 A1 | 8/2015 | Dolan | |
| 2015/0220996 A1 | 8/2015 | Bhamidipati et al. | |
| 2015/0227972 A1 | 8/2015 | Tang | |
| 2015/0237056 A1 | 8/2015 | Arnold et al. | |
| 2015/0278251 A1 | 10/2015 | Pathak et al. | |
| 2016/0148298 A1 | 5/2016 | Tang et al. | |
| 2017/0083599 A1 | 3/2017 | Bostick et al. | |

OTHER PUBLICATIONS

Non-final Office Action dated Mar. 14, 2016; Design U.S. Appl. No. 29/477,738 (8 pages).
Non-final Office Action dated Mar. 18, 2016; U.S. Appl. No. 14/140,901, filed Dec. 26, 2013 (17 pages).
Non-Final Office Action, issued in the pending U.S. Appl. No. 15/070,667, dated Jun. 14, 2018, 49 pages.
Final Office Action issued for U.S. Appl. No. 14/140,901, dated Sep. 20, 2016 (25 pages).
L. G. Bratthall et al., "Integrating Hundred's of Products through One Architecture—The Industrial IT architecture," ICSE '02, May 19-25, 2002, Orlando, FL (11 pages).
Print out from http://fab.com/department/furniture/?ref=subnav; printed on or about May 7, 2014; 1 page; possibly available as early as May 2, 2013 according to https://web.archive.org/web/20130502003733/http://fab.com/department/furniture/?ref=subnav.
Print out from Internet archive https://web.archive.org/web/20120609001741/http://www.zappos.com/new-shoes~2W?s=isNew/desc/goLiveDate/desc/; archived on Jun. 9, 2012; 1 page.
Print out from Internet archive https://web.archive.org/web/20131114195516/http://top-pins.apps.zappos.com/; archived on Nov. 14, 2013; 1 page.
Print out from internet archive https://web.archive.org/web/20131028210234/http://glance.apps.zappos.com/trending?; archived on Oct. 28, 2013; 1 page.
Office Action from Canadian Patent Application No. 155,236, dated Nov. 22, 2014 (3 pages).
Office Action from Canadian Patent Application No. 155,235, dated Nov. 22, 2014 (2 pages).
Office Action from Canadian Patent Application No. 2,842,970, dated Jan. 23, 2015 (3 pages).
"Amazigg:Trending amazon products", https://web.archive.org/web/20120220075432/htpp://www.amazigg.com/weekly-top/, Feb. 20, 2012 (3 pages).
"Explore collections", https://web.archive.org/web/20131114011323/http://www.ebay.com/cln, Nov. 14, 2013 (4 pages).
"Trending hot products", https://web.archive.org/web/20130104015040/http://www.alibaba.com/showroom/trending-hot-products.htm, Oct. 14, 2013 (8 pages).
Design U.S. Appl. No. 29/477,737, filed Dec. 26, 2013 (2 pages).
"Spark Studio" found online at http://www.walmart.com/spark/category/all, in existence prior to Dec. 26, 2013 (1 page).
Rachel Arthur, "Retail's 7 Most Innovative Holiday Campaigns," found online at http://fashionista.com/2013/12/holiday-retail-campaigns, published Dec. 16, 2013 (6 pages).
Dhani Mau, "Rebecca Minkoff and Toms Open Up Digital Storefronts," found online at http://fashionista.com/2013/11/rebecca-minkoff-and-toms-open-up-digital-storefronts, published Nov. 25, 2013 (3 pages).
Design U.S. Appl. No. 29/477,738, filed Dec. 26, 2013 (3 pages).
Printout from Canopy.co, found online at https://web.archive.org/web/20130805071406/http://canopy.co/; archived on Aug. 5, 2013; printed on May 18, 2017 (1 page).
U.S. Final Office Action, issued in the U.S. Appl. No. 15/070,667, dated Jan. 10, 2019, 33 pages.
U.S. Non-final Office Action, issued in the U.S. Appl. No. 15/070,667, dated Jun. 11, 2019, 31 pages.

* cited by examiner

RETAIL WEBSITE USER INTERFACE, SYSTEMS, AND METHODS FOR DISPLAYING TRENDING LOOKS

FIELD

This disclosure relates generally to the field of user interfaces on websites that offer products for purchase, such as on retailer websites.

BACKGROUND

Consumers purchase products in retail stores and via retail websites accessible from the Internet. Shopping via a retail website allows consumers to interact with text, pictures, videos, and/or audio clips relating to the products the consumer is contemplating purchasing. Often, shopping via the retail website allows the consumer to view reviews by other consumers, search for related products, search for products that other consumers bought at the same time, or the like. In some instances, the inventory of products available from a retailer through the retail website can be different from the products available at the retail store.

Improved ways to enhance a consumer's shopping experience are desirable.

SUMMARY

This disclosure relates generally to the field of user interfaces on websites that offer products for purchase, such as on retailer websites.

A system including a graphical user interface (GUI) displayed on a display device is disclosed. The GUI includes a plurality of images displayed on the display device, each image being of a look that is determined to be trending within a previous time period. Each image is displayed as taken by a photographer and posted on one or more social networks.

An Internet website system is also disclosed. The Internet website system includes at least one server that is connectable to the Internet and that is configured to provide a website that is viewable on a display device, the website displays a plurality of separate images arranged in a plurality of rows and columns; each image is of a look that includes one or more products that are for sale by a retailer and has been posted on one or more social networks; each image is displayed as taken by a photographer and posted on one of the one or more social networks; and each image is identified based on a tag or identifier associated with the image on the one or more social networks.

A computer-implemented method of presenting products to a consumer for purchase via a GUI on a display device of the consumer is also disclosed. The computer-implemented method includes determining looks that are trending; and via a website that is accessible by the consumer and that is rendered via one or more servers, displaying on the display device of the consumer an image of each trending look, and displaying each image as taken by a plurality of photographers and posted on one or more social networks.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

A website is described that presents a graphical user interface (GUI) that displays images to a user. The images that are displayed are of looks that are determined to be recently trending or popular prior to being displayed. The user interface is constructed to focus on the trending looks themselves so that the user interface is clean and uncluttered, allowing customers to identify products within the looks which they would like to purchase.

The website can be, for example, a website that is owned, operated and/or controlled by a retail company, with the images including products that are for sale by the retail company either in a retail store or on-line on the same website or on a separate website.

A trending look, as used herein, is a look that is currently popular, in style, or in vogue. A look is determined to be trending based on data derived from one or more sources. For example, the data can be a tag or other identifier associated with an image which is posted on a social network. The tag or other identifier associated with the image can be a tag or identifier that is specifically selected by a retailer such that the retailer can identify one or more images having the tag or identifier associated. A trending look can include a single product, or a plurality of products, with or without a person or people in the image. For example, a trending look can include one or more clothing items, according to an embodiment, and a trending look can also include one or more clothing items and an individual or individuals wearing the one or more clothing items.

A social network is a virtual community or network in which people can create, share, and/or exchange information and ideas, for example on-line via the Internet. Examples of social networks from which data can be derived in order to identify trending looks include, but are not limited to, Pinterest, Facebook, Instagram, Twitter, Google+, and the like.

A photographer includes an individual capturing an image with a camera. Photographers can be professionals or amateurs. As used herein, photographers include anybody who captures an image and posts that image on one or more social networks.

In an embodiment, a system includes a GUI displayed on a display device. The GUI includes a plurality of images displayed on the display device, each image being of a look that is determined to be trending.

Figure 1:
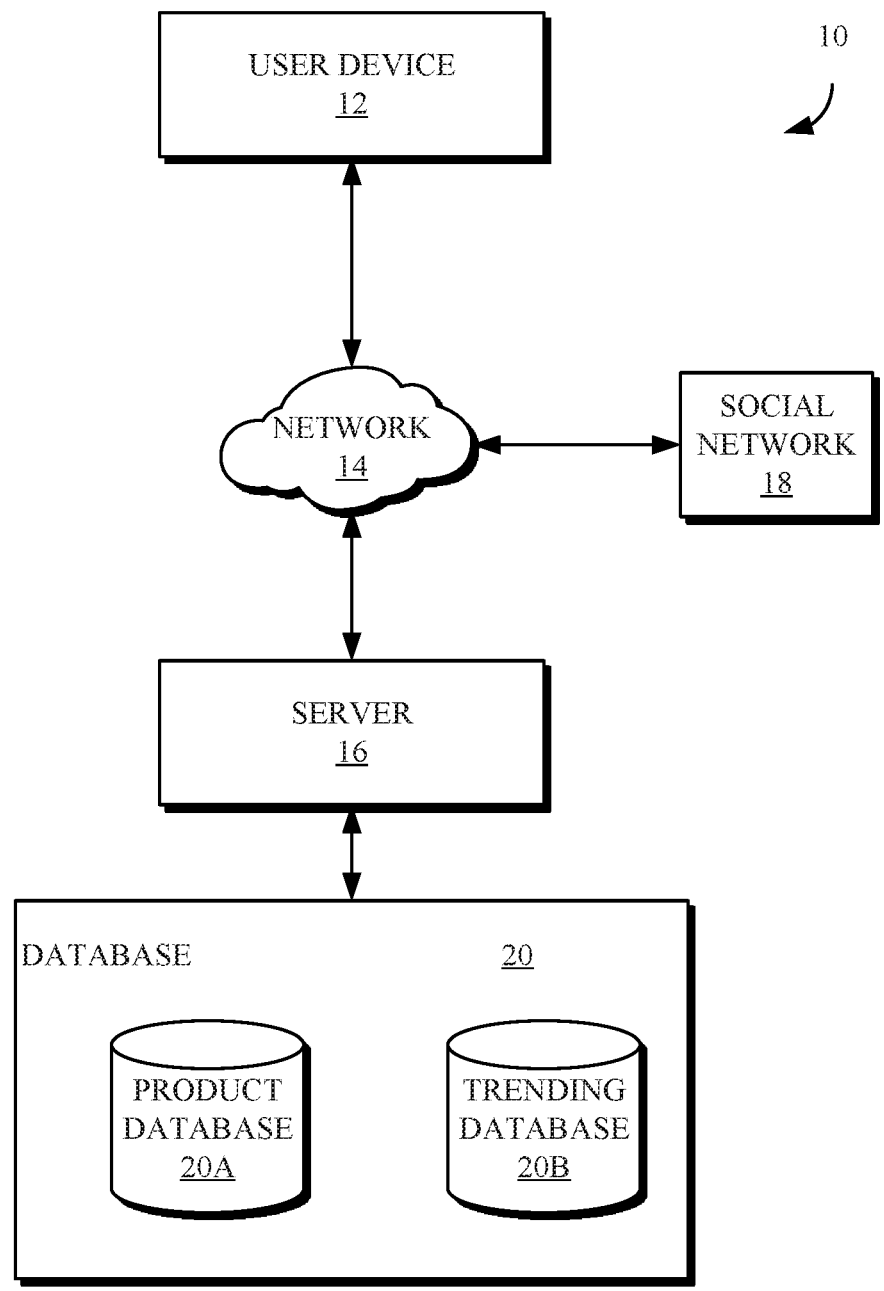
FIG. 1 is a schematic diagram of a system for implementing the user interfaces, systems, and methods described herein, according to an embodiment.

FIG. 1 is a schematic diagram of a system 10 for implementing the user interfaces, systems, and methods described herein, according to an embodiment. In the system 10, trending looks data is gathered from one or more social networks 18.

In the system 10, a server 16 is connected in communication with a user device 12 via a network 14.

The server 16 can make a GUI available to the user device 12. The server 16 can make the GUI available over the network 14 according to principles known in the art suitable for allowing a user to access and view the GUI with the user device 12. In an embodiment, aspects of the server 16 can be the same as or similar to aspects of server device 535 as described in accordance with FIG. 6 below. An application can be loaded onto the user device 12 that can include one or more features of the server 16. For example, the application can make the GUI available to the user device 12, according to an embodiment. Further, in an embodiment, the application can include a database of products, information about one or more trending looks, or the like, such that the information does not need to be obtained over the network 14 from the server 16.

In an embodiment, the network 14 can generally represent the Internet. In an embodiment, the network 14 can include, for example, a local area network (LAN), a wide area network (WAN), a wireless network, a cellular data network, or the like. In an embodiment, aspects of the network 14 can be the same as or similar to aspects of network 540 as described in accordance with FIG. 6 below.

A user can view and/or purchase one or more products from a retailer by viewing one or more trending looks in the system 10 via the user device 12. Examples of the user device 12 include, but are not limited to, a personal computer (PC), a laptop computer, a mobile device (e.g., a smartphone, a personal digital assistant (PDA), a tablet-style device, etc.), or the like. The GUI 16 is displayable on a display of the user device 12. Examples of the display for the user device 12 include, but are not limited to, a monitor connected to a PC, a laptop screen, a mobile device screen, a tablet screen, or the like. In an embodiment, aspects of the user device 12 can be the same as or similar to aspects of user devices 501 as described in accordance with FIG. 6 below.

The server 16 is in communication with a database 20. The database 20 generally includes a variety of information on products available from a retailer, such as products in a product database 20A. In an embodiment, the products may be those products that are available from a particular catalog, such as, but not limited to, a clothing catalog, or the like. In an embodiment, the products may be those products that are available from the retailer, either through the retailer's website or in a retail store of the retailer. The database 20 also includes information related to trending looks, such as a trending database 20B. The trending database 20B can store a plurality of images corresponding to a plurality of trending looks. This can include information such as, but not limited to, an image of a trending look, a creator of the trending look, a profile of the creator of the trending look, or the like.

The server 16 can be in communication with the social network 18 via the network 14. In an embodiment, the social network 18 can include one or more images being tagged with one or more indicators. Trending looks tagged with a particular indicator corresponding to the retailer may be posted on the social network 18. The server 16 can make this information available to the system 10 in order to display the one or more trending looks on the user device 12. Examples of the social network 18 include, but are not limited to, Google+, Pinterest, Facebook, Instagram, Twitter, or the like.

Figure 2:
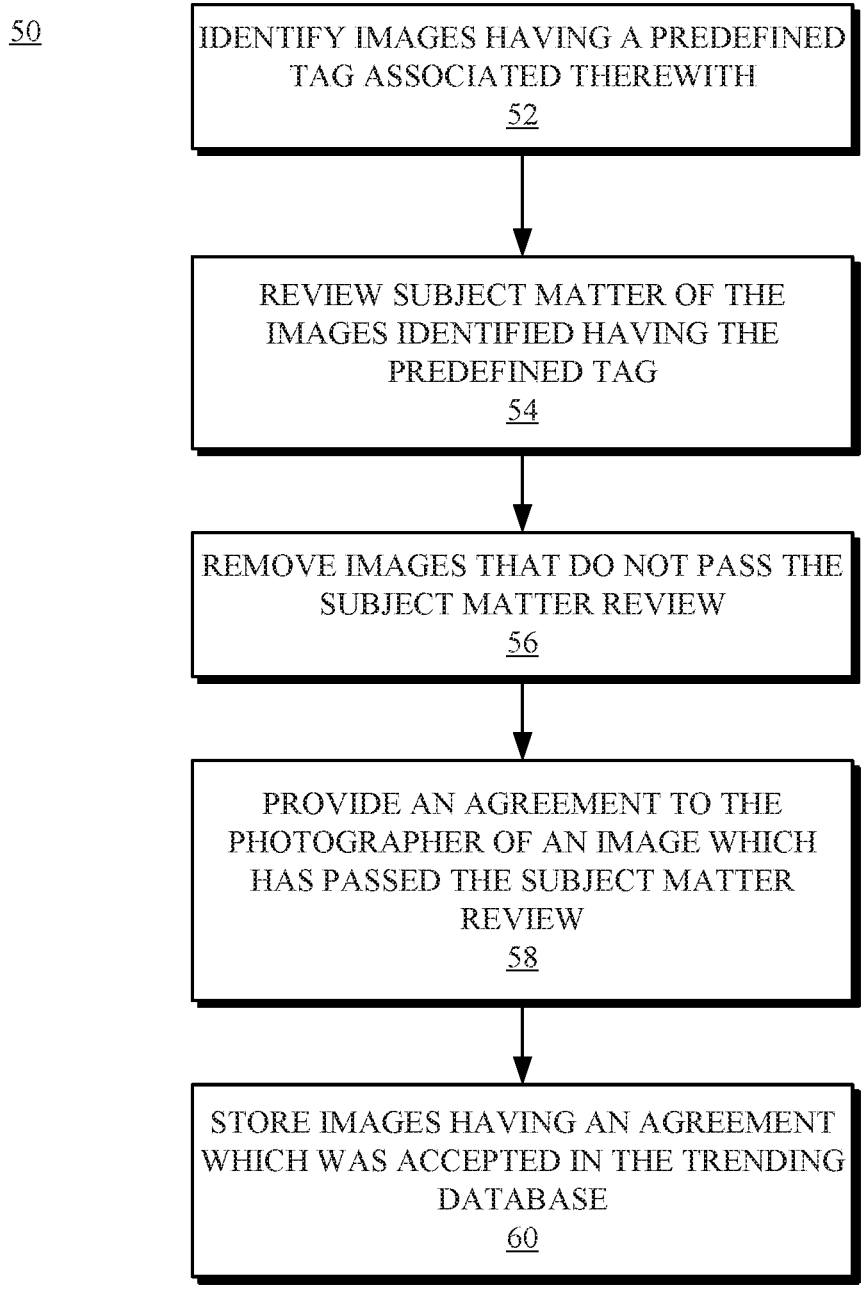
FIG. 2 is a flowchart depicting a process for identifying one or more trending looks, according to an embodiment.

FIG. 2 is a flowchart depicting a process 50 for identifying one or more trending looks, according to an embodiment. In the process 50, images are gathered from one or more social networks 18 (FIG. 1), and one or more trending looks are displayed for a website visitor. The process 50 can be executed periodically (e.g., every 5 minutes, 10 minutes, 1 hour, etc.) or can be executed continuously to continually identify the one or more trending looks on an ongoing basis. Once the trending looks are identified, the trending looks can be displayed on a display of the user device 12 (FIG. 1) for the website visitor. When displayed, the most recent trending looks can be displayed at a top of the user interface. Accordingly, as new trending looks are identified, the older trending looks can be pushed to a lower portion of the user interface. In this manner, the trending looks being displayed first may generally be the most current trending looks. In some embodiments, the displaying of the trending looks can include one or more filters controlling which trending looks are displayed. For example, the filters can prevent trending looks that are older than a specified time period (e.g., 7 days, etc.) from being displayed to the website visitor. In an embodiment, the filters may include a specified number of trending looks. In such an embodiment, if the website visitor scrolls to an end of the user interface, additional (older) trending looks may be displayed.

At 52, the server 16 (FIG. 1) identifies one or more images having a particular tag or identifier associated therewith. In an embodiment, the tag or identifier may alternatively be referred to as a hashtag or the like. For example, the retailer may have selected a particular tag such as, but not limited to, "RetailerStyle," "#RetailerStyle," or the like. It is to be appreciated that this tag is an example and that the particular tag selected can vary according to the principles described in this specification. At 52, the server 16 can search the various social networks 18 for images which have been tagged with "#RetailerStyle." Upon identifying an image having this particular tag, the server 16 can identify information associated with the photographer that produced the image. For example, this can include identifying information such as, but not limited to, a username on the social network, contact information associated with the username (e.g., an email address, private message name, or the like).

At 54 the one or more images having the particular tag or identifier can be reviewed based on the subject matter of the images. The subject matter review of the images can include, for example, reviewing the images to determine whether the images include subject matter that is appropriate for association with the retailer. This can include, for example, reviewing the images for profanity, or other aspects which are not in accordance with the retailer's mission or values.

At 56, images which are identified as including subject matter that includes profanity or is not in accordance with the retailer's mission or values may be removed from the system. In an embodiment, an administrator may review and identify images which include subject matter that includes profanity or is not in accordance with the retailer's mission or values.

At 58, the server 16 may provide an agreement to the photographer who captured the image for those images which have been identified as passing the subject matter review (e.g., do not contain profanity and/or are not in conflict with the retailer's mission or values).

At 60, if the agreement is accepted, the image is stored in the trending database 20B for inclusion in the user interface displayed on the user device 12. In an embodiment, accepting the agreement can include signing and/or dating the agreement. In an embodiment, accepting the agreement can include selecting an agreement checkbox on a website displaying the agreement to the photographer, or the like.

Figure 3:
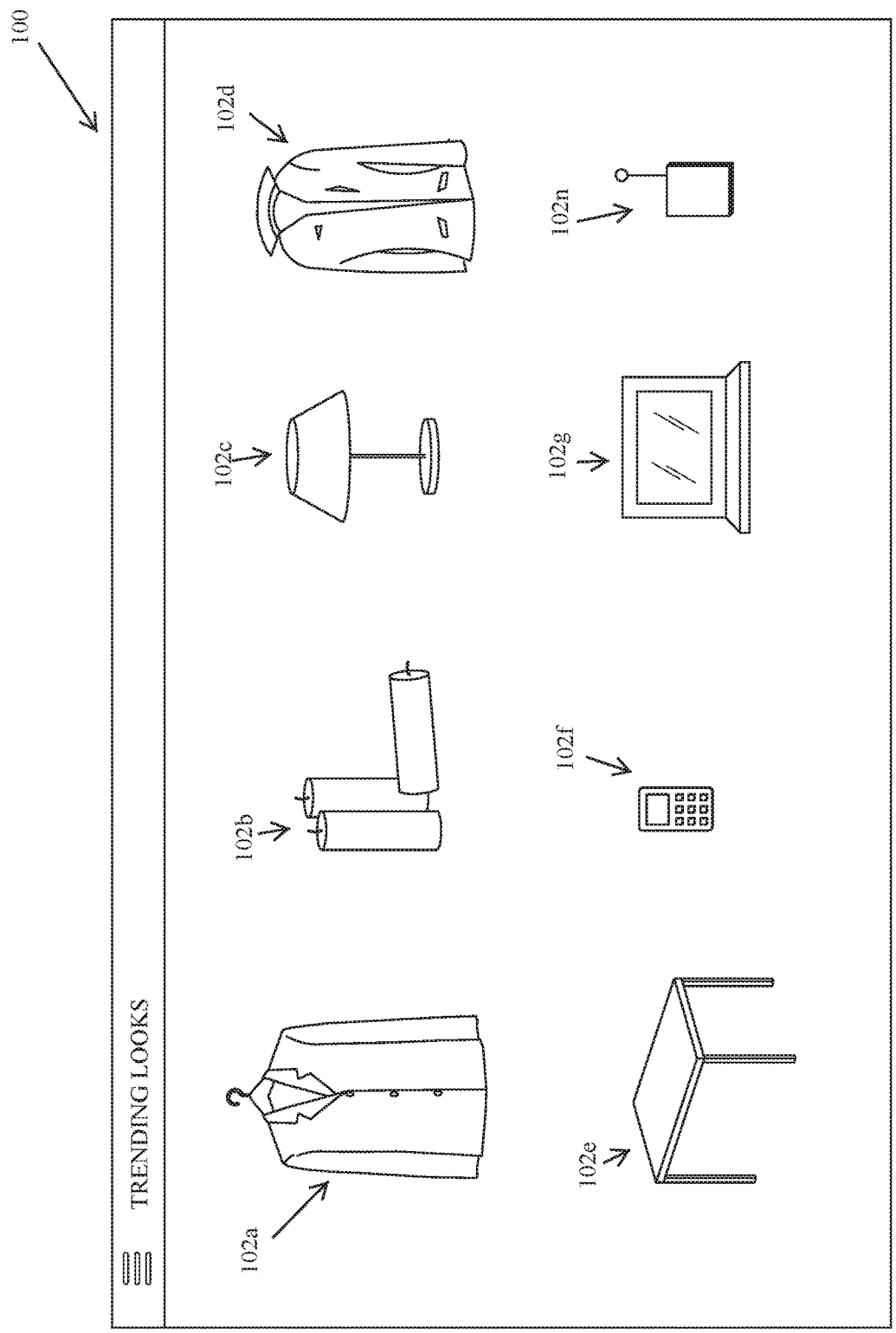
FIGS. 3-4 depict a graphical user interface (GUI) of a website as described herein, according to an embodiment.
Figure 4:
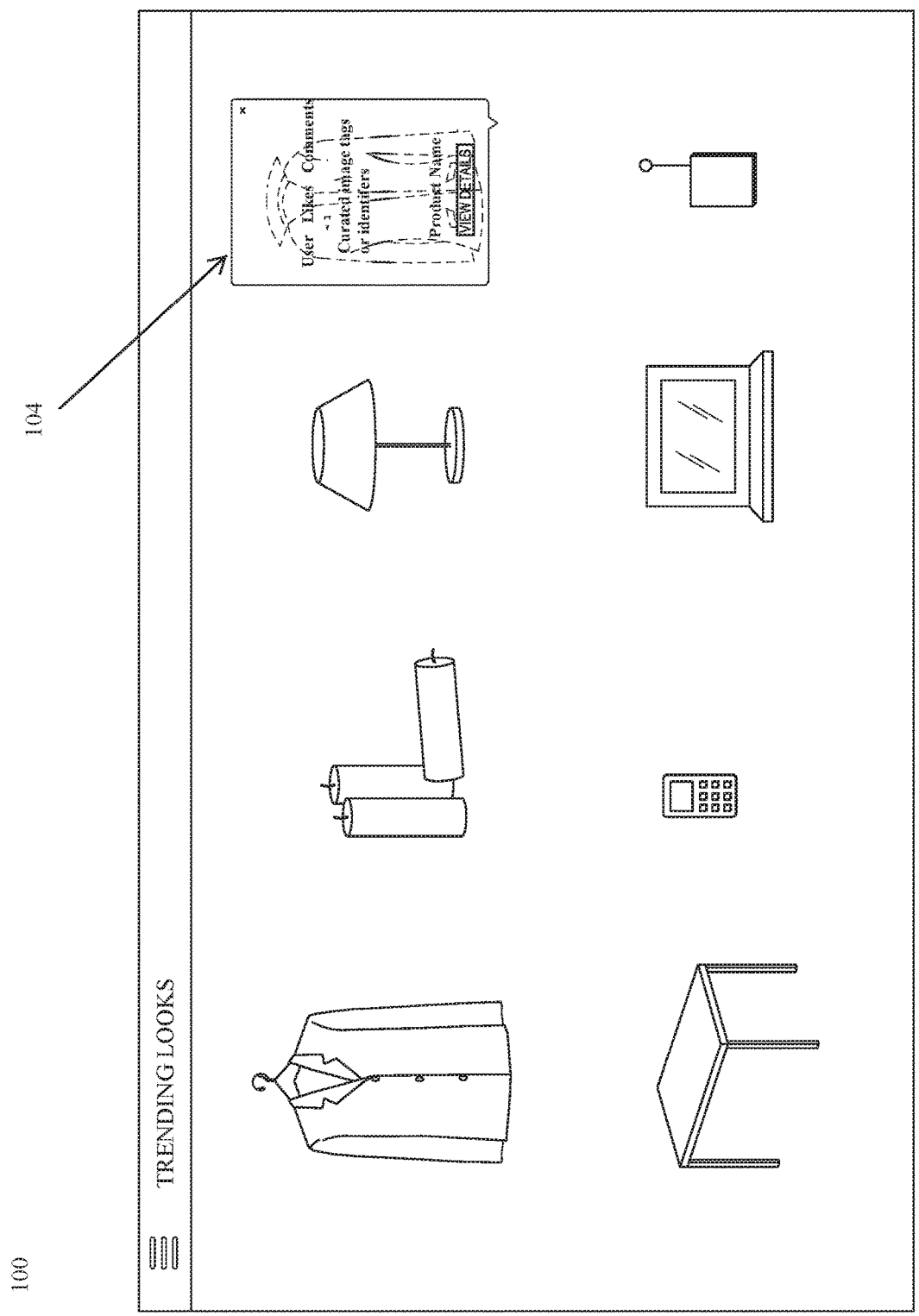

FIGS. 3-4 depict a graphical user interface (GUI) 100 of a website as described herein, according to an embodiment.

More specifically, the GUI 100 is of the website displaying trending looks, according to an embodiment. Images of a plurality of trending looks 102a ... 102n are displayed on the GUI 100. As illustrated, each look is showing a particular product without text, naming, or description of the look. The images 102a ... 102n are displayed on the GUI 100 in an arrangement of a plurality of rows and a plurality of columns. Any number of rows and columns can be used. In an embodiment, a particular image can span more than one row and/or more than one column. In an embodiment, additional rows may be added by scrolling to a bottom of the GUI.

The images 102a ... 102n can be arranged in any desired order on the GUI 100. For example, in an embodiment, the images 102a ... 102n can be ordered based on the order in which they are identified as trending looks. That is, relatively newer trending looks are displayed in a top-down or last-received, first displayed manner. That is, newer trending looks can be displayed at a top of the GUI. It will be appreciated that the order can be modified based on other information such as, but not limited to, a number of likes of the image, a popularity of the photographer, or the like.

Each image 102a ... 102n is displayed as a hyperlink that allows each image to be selected by the website visitor on the GUI 100. When one of the images 102a ... 102n is selected, an overlay image 104 (FIG. 4) is displayed over at least a part of the selected image with the selected image remaining displayed in the background. With reference to FIG. 4, the overlay image 104 can display various information on the selected image. Examples of information that can be displayed can include, but are not limited to, a social media username of the photographer, a number of likes and/or comments associated with the image on one or more social networks 18, an image and/or text of a particular product within the image, text naming or describing the particular product, comments on the product from a review of the particular product by a prior purchaser, a price of that particular product, a hyperlink that directs to another web page, such as the main website of the retailer, and to permit viewing of further details of that particular product including ordering/purchasing options from the retailer selling the particular product.

A website visitor can select a hyperlink on the GUI 100 or select one of the images 102a ... 102n in any manner. For example, a selection can be made by hovering a cursor over an image to be selected; a selection can be made by a user placing a cursor on the image and using a mouse device to click the image; a selection can be made by the user using her finger to hover over or physically touch the display at the location of the image to be selected; a selection can be made using voice commands, or the like.

One or more filters may be utilized to limit the trending looks that are displayed on the GUI 100. For example, trending looks that are in a particular category (e.g., summer looks, fall looks, etc.) may be selected for display. In an embodiment, the one or more filters may be, for example, a checkbox or other selectable feature displayed on the GUI 100. In an embodiment, a trending look may not be displayed if it has less than a threshold number of likes. In an embodiment, trending looks in certain categories, such as out of season, may not be shown.

It will be appreciated that the images 102a ... 102n can be digital content other than a photograph. For example, in an embodiment, one or more of the images 102a ... 102n can be a video, an image in a Graphics Interchange Format ("GIF") which can include, for example, animations, or the like. In such an embodiment, the additional formats may be available to, for example, social media users that have achieved a particular popularity threshold. For example, social media users who have received more likes than a threshold amount may have access to display additional content types. In an embodiment, the additional formats may be available to social media users who have posted a minimum number of images on social networks having the particular tag or identifier associated with the retailer. For example, a social media user that has posted more than 10 images may have the ability to post content in additional formats. It is to be appreciated that the number 10 is an example and that other minimum numbers of posts are within the scope of this description. In an embodiment, the number of images may be determinative and a single post including 10 pictures may enable the social media user to post content in additional formats.

In an embodiment, the GUI 100 can be specific to a particular photographer. That is, the GUI 100 can include trending looks that are all supplied by the same social media user. In an embodiment, this can be a social media user that is particularly selected by the retailer. In such an embodiment, the particular social media user may be able to include digital content other than photographs.

Figure 5:
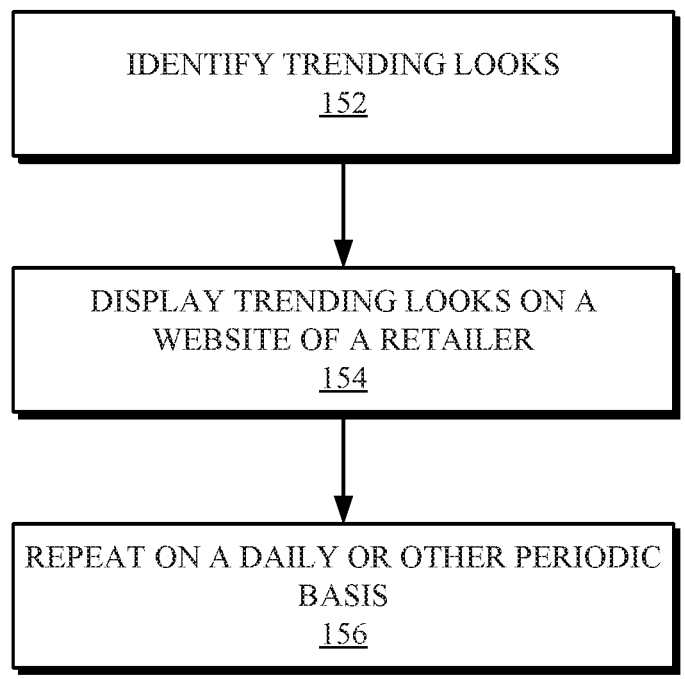
FIG. 5 is a flowchart depicting a process for displaying trending looks on the website GUI of FIGS. 3-4, according to an embodiment.

FIG. 5 is a flowchart depicting a process 150 for displaying trending looks on the website GUI 100 of FIGS. 3-4, according to an embodiment. In the process, the trending looks are gathered 152 (e.g., according to the process 50 as described in accordance with FIG. 2 above), and then the trending looks are displayed 154 on the website GUI 100. This process is then repeated 156 on an hourly, daily, or other periodic basis.

The trending looks may be images captured in a relatively recent, predetermined time period. For example, the trending looks may be those that are identified within the past seven days and that include a particular identifier, as described above with respect to FIG. 2. In an embodiment, the time period can be a period other than seven days.

Figure 6:
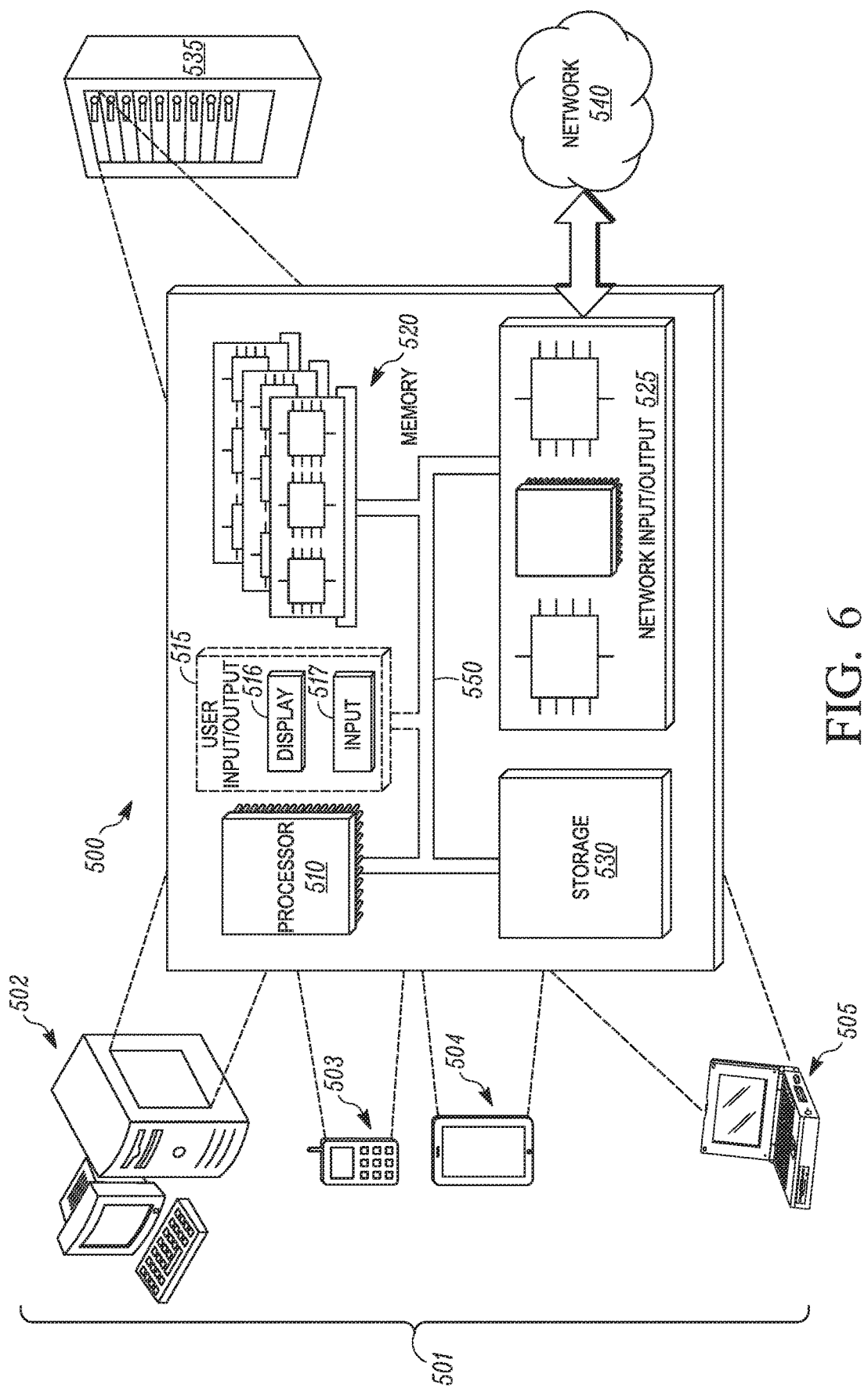
FIG. 6 is a schematic diagram for an architecture for a computing device, according to an embodiment.

FIG. 6 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to an embodiment. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In an embodiment, the user devices 501 can alternatively be referred to as client devices 501. In such embodiments, the client devices 501 can be in communication with the server device 535 through the network 540. One or more of the client devices 501 can be in communication with another of the client devices 501 through the network 540 in an embodiment.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In an embodiment, the processor 510 can be a single-threaded processor. In an embodiment, the processor 510 can be a multi-threaded processor.

The user I/O 515 can include a display 516 and/or an input 517, according to an embodiment. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In an embodiment, the display 516 and input 517 can be physically included with the computer device 500 for the desktop computer 502. In an embodiment, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In an embodiment, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In an embodiment the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In an embodiment, the memory 520 can be a volatile memory. In an embodiment, the memory 520 can be a non-volatile memory. In an embodiment, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In an embodiment, the storage 530 is a computer readable medium. In an embodiment, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In an embodiment, the network I/O 525 can transmit data via the network 540 through a wireless connection using WiFi, Bluetooth, or other similar wireless communication protocols. In an embodiment, the computer device 500 can transmit data via the network 540 through a cellular, 3G, 4G, or other wireless protocol. In an embodiment, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In an embodiment, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A system for allowing a consumer to identify and purchase a product depicted within a trending image, the system comprising:

a server that searches one or more social networks to identify one or more images having a particular tag or identifier, removes any of the one or more images identified as having subject matter that is in conflict with a mission or value of a retailer, provides an agreement to each photographer who captured at least one of the one or more images, receives an acceptance of a photographer agreement for the one or more images, and stores the one or more images not removed and having a photographer agreement into a database to create a plurality of trending images, wherein a format of each of the one or more images includes one or more of a digital photograph, a digital video, or a Graphics Interchange Format (GIF); and a graphical user interface (GUI) made available by the server for display on a display device, the GUI is a website of the retailer that sells products, the GUI including:

the plurality of trending images that are selectable and displayed on the display device, each trending image being of a look that is determined to be trending within a previous time period, and each of the plurality of trending images including one or more products that are available for purchase via the retailer, the look being determined to be trending based on information from the one or more social networks that are separate from the website of the retailer including the tag or identifier associated with a corresponding trending image of the plurality of trending images and a total number of likes of the trending image via the one or more social networks, the information from the one or more social networks including the particular tag or identifier associated with the look on the one or more social networks, the plurality of trending images being displayed so that a most recent look that is determined to be trending is displayed at a top of the GUI; and each of the plurality of trending images is displayed on the website of the retailer as taken by the photographer and as previously posted on the one or more social networks, the website receiving a selection of one of the plurality of trending images, and wherein upon the website receiving the selection:

an overlay image is automatically displayed over at least a part of the selected trending image, wherein the overlay image includes a social media username of a photographer that captured the selected trending image, and text from the one or more social networks, and a hyperlink is automatically displayed that directs a user to a location on the website to permit viewing of further details of the one or more products depicted within the selected trending image that are available for purchase via the retailer and to permit purchase/ordering of the one or more products depicted within the selected trending image on the website.

2. The system according to claim 1, wherein the total number of likes of the corresponding trending image is greater than a threshold number of likes.

3. The system according to claim 1, wherein the system reviews subject matter of the one or more images.

4. The system according to claim 3, wherein the server removes any of the one or more images having subject matter that is profane.

5. The system according to claim 1, wherein the plurality of trending images are displayed on the display device in an arrangement of rows and columns including at least 4 columns.

6. An Internet web site system for allowing a consumer to identify and purchase a product depicted within a trending image, the Internet website system comprising:

at least one server that is connectable to the Internet and that is configured to search one or more social networks to identify one or more images having a particular tag or identifier, removes any of the one or more images identified as having subject matter that is in conflict with a mission or value of a retailer, provides an agreement to each photographer who captured at least one of the one or more images, receives an acceptance of a photographer agreement for the one or more images, and stores the one or more images not removed and having a photographer agreement into a database to create a plurality of trending images, and that is configured to provide a website that is viewable on a display device, the website displays the plurality of trending images arranged in a plurality of rows and columns; each trending image is selectable and is of a look that includes one or more products that are for sale by a retailer and has been posted on one or more social networks that are separate from the website of the retailer, wherein each look is determined to be trending based on the tag or identifier associated with a corresponding trending image of the plurality of trending images and a total number of likes of the trending image via the one or more social networks; each trending image is displayed as taken by the photographer and as previously posted on one of the one or more social networks; and each trending image is identified based on the tag or identifier associated with the trending image on the one or more social networks, a most recent look is displayed at a top of the website; the website receives a selection of one of the plurality of trending images, upon the website receiving the selection:

an overlay image is automatically displayed over at least a part of the selected trending image, wherein the overlay image includes text from the one or more social networks, a social media username of the photographer that captured the selected trending image, and a hyperlink is automatically displayed that directs the consumer to a location on the web site to permit viewing of further details of the one or more products depicted within the selected trending image that are available for purchase via the retailer and to permit purchasing/ordering of the one or more products depicted within the selected trending image on the web site;
wherein a format of each of the one or more images includes one or more of a digital photograph, a digital video, or a Graphics Interchange Format (GIF).

7. The Internet website system according to claim 6, wherein the website displays trending images that were captured by a plurality of photographers having accepted the agreement.

8. A computer-implemented method of presenting products to a consumer for purchase via a graphical user interface (GUI) on a display device of the consumer, comprising:
one or more servers searching one or more social networks to identify one or more images having a particular tag or identifier in order to determine looks that are trending, wherein a format of each of the one or more images includes one or more of a digital photograph, a digital video, or a Graphics Interchange Format (GIF);
the one or more servers removing any of the one or more images identified as having subject matter that is in conflict with a mission or value of a retailer;
the one or more servers providing an agreement to each photographer who captured at least one of the one or more images;
the one or more servers receiving an acceptance of a photographer agreement for the one or more images;
the one or more servers storing the one or more images not removed and having a photographer agreement into a database to create a plurality of trending images;
via a website that is accessible by the consumer and that is rendered via the one or more servers, displaying on the display device of the consumer a trending image that is selectable of each trending look with a most recent trending look being displayed at a top of the website, wherein each trending look is determined to be trending based on the tag or identifier associated with a corresponding trending image of the one or more trending images and a total number of likes of the corresponding trending image via the one or more social networks, the website being separate from the one or more social networks, displaying each trending image as taken by a plurality of photographers and as previously posted on the one or more social networks, receiving a selection of the trending image, upon receiving the selection of the trending image:
automatically displaying an overlay image over at least a part of the selected trending image, wherein the overlay image includes text from the one or more social networks, and a social media username of a photographer that captured the selected trending image, and
automatically displaying a hyperlink that directs the consumer to a location on the website to permit viewing of further details of the one or more products depicted within the selected trending image that are available for purchase via the retailer and to permit purchase/ordering of the one or more products depicted within the selected trending image on the web site.

\* \* \* \* \*